(12) United States Patent
Campbell et al.

(10) Patent No.: US 12,153,805 B2
(45) Date of Patent: Nov. 26, 2024

(54) METHODS AND APPARATUS FOR ISSUING MEMORY ACCESS COMMANDS

(71) Applicant: ARM LIMITED, Cambridge (GB)

(72) Inventors: Michael Andrew Campbell, Cambridge (GB); Matteo Maria Andreozzi, Cambridge (GB); Lorenzo Biagini, Grosseto (IT); Giovanni Stea, Cascina Pisa (IT); Ankit Mehta, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/755,507

(22) PCT Filed: Sep. 1, 2020

(86) PCT No.: PCT/GB2020/052093
§ 371 (c)(1),
(2) Date: Apr. 29, 2022

(87) PCT Pub. No.: WO2021/084223
PCT Pub. Date: May 6, 2021

(65) Prior Publication Data
US 2022/0374154 A1    Nov. 24, 2022

(30) Foreign Application Priority Data

Oct. 29, 2019  (GB) ..................................... 1915651

(51) Int. Cl.
*G06F 3/06* (2006.01)
(52) U.S. Cl.
CPC .......... *G06F 3/0622* (2013.01); *G06F 3/0655* (2013.01); *G06F 3/0673* (2013.01)

(58) Field of Classification Search
CPC .... G06F 3/0622; G06F 3/0655; G06F 3/0673; G06F 13/1626; G06F 13/1642; Y02D 10/00
See application file for complete search history.

(56) References Cited

U.S. PATENT DOCUMENTS

| 6,564,304 | B1 | 5/2003 | Van Hook et al. |
| 7,370,296 | B2 * | 5/2008 | Koyfman ............ G06F 11/2257 |
| | | | 716/106 |
| 8,271,746 | B1 | 9/2012 | Hutsell et al. |

(Continued)

FOREIGN PATENT DOCUMENTS

EP            0649100 A2 *  4/1995  ............. G06F 15/80

*Primary Examiner* — Zhuo H Li
(74) *Attorney, Agent, or Firm* — NIXON & VANDERHYE P.C.

(57) ABSTRACT

Examples of the present disclosure relate to an apparatus comprising interface circuitry to receive memory access commands directed to a memory device, each memory access command specifying a memory address to be accessed. The apparatus comprises scheduler circuitry to store a representation of a plurality of states accessible to the memory device and, based on the representation, determine an order for the received memory access commands. The apparatus comprises dispatch circuitry to receive the received memory access commands from the scheduler circuitry and issue the received memory access commands, in the determined order, to be performed by the memory device.

16 Claims, 10 Drawing Sheets

(56) References Cited

U.S. PATENT DOCUMENTS

| | | |
|---|---|---|
| 2003/0074504 A1* | 4/2003 | Weber .................. G06F 13/161 |
| | | 710/107 |
| 2003/0074520 A1 | 4/2003 | Weber |
| 2003/0163654 A1 | 8/2003 | Louzoun et al. |
| 2003/0217239 A1* | 11/2003 | Jeddeloh ................ G06F 12/14 |
| | | 711/158 |
| 2020/0174630 A1* | 6/2020 | Rosenberg ............... G09B 5/00 |
| 2020/0371937 A1* | 11/2020 | Chachad ............... G06F 9/544 |
| 2022/0253334 A1* | 8/2022 | Nakamura ............. G06Q 30/02 |
| 2023/0100573 A1* | 3/2023 | Jeong .................. G06F 3/0611 |
| | | 711/154 |

* cited by examiner

METHODS AND APPARATUS FOR ISSUING MEMORY ACCESS COMMANDS

The presented technique relates to the field of processors. More particularly, it relates to the scheduling and issuing of memory access commands to be performed by a memory device.

Processing circuitry may interact with a memory device to access data, stored on the memory device, on which processing operations are to be performed. Examples of such processing circuitry include general-purpose processing devices such as central processing units and graphics processing units, as well as dedicated processing devices for a particular application. Examples of such memory devices include dynamic random access memory and static random access memory.

Such processing circuitry can interact with the memory device by issuing memory commands to be performed by the memory device. In some systems, these commands are not issued directly to the memory device but are instead transmitted to an intermediate device such as a memory controller.

The intermediate device may simply pass the received memory access commands on to the memory in the order in which they are received from the processing circuitry. However, some intermediate devices perform a scheduling operation whereby the received memory access commands are re-ordered for issue to the memory device. Such ordering can improve memory performance, for example by increasing the rate at which memory access commands can be serviced.

There is therefore a desire for improved intermediate device to provide improved memory performance.

In one example configuration, there is provided an apparatus comprising:
 interface circuitry to receive memory access commands directed to a memory device, each memory access command specifying a memory address to be accessed;
 scheduler circuitry to:
 store a representation of a plurality of states accessible to the memory device; and
 based on the representation, determine an order for the received memory access commands, and
 dispatch circuitry to:
 receive the received memory access commands from the scheduler circuitry; and
 issue the received memory access commands, in the determined order, to be performed by the memory device.

In a further example configuration, there is provided a system comprising:
 the apparatus of any preceding claim; and
 the memory device.

In a further example configuration, there is provided a method comprising:
 receiving memory access commands directed to a memory device, each memory access command specifying a memory address to be accessed;
 based on a stored representation of a plurality of states available to the memory device, determining an order for the received memory access commands; and
 issuing the received memory access commands, in the determined order, to be performed by the memory device.

The present technique will be described further, by way of illustration only, with reference to examples thereof as illustrated in the accompanying drawings, in which:

FIG. 1 shows schematically a system according to an example of the present disclosure.

Figure 1:
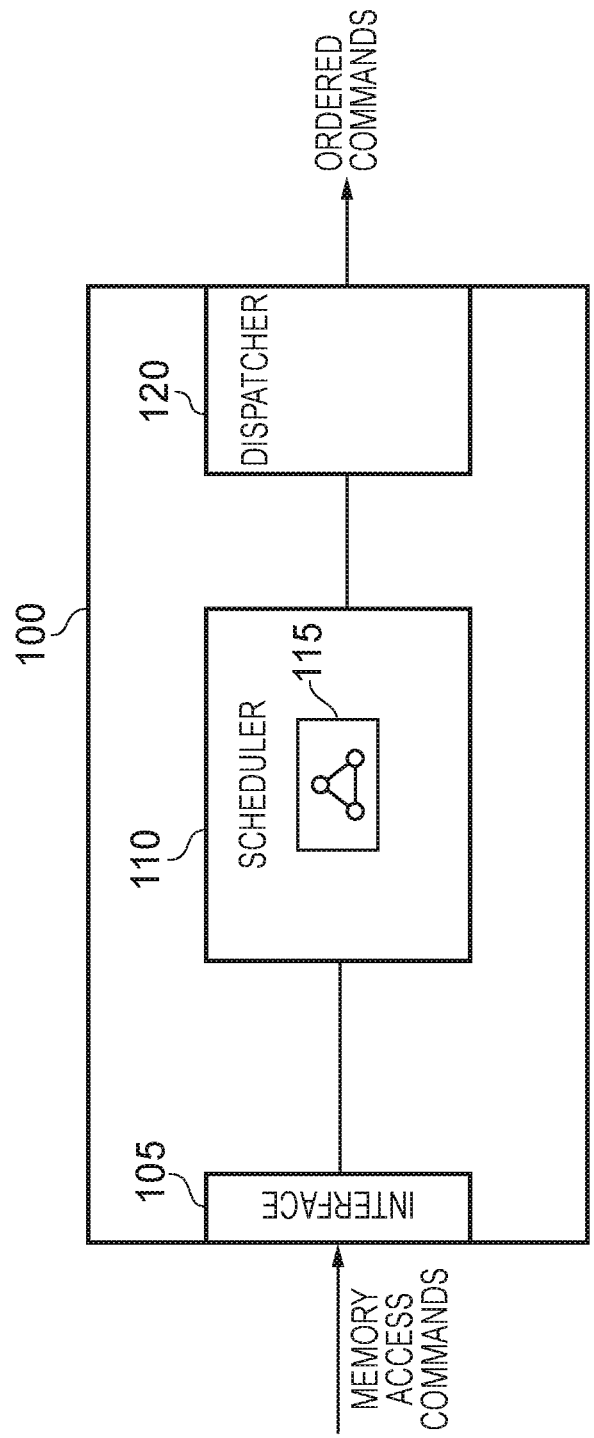
FIG. 1 shows schematically an apparatus according to an example of the present disclosure.

As set out above, according to an aspect of the present disclosure there is provided an apparatus comprising interface circuitry, scheduler circuitry and dispatch circuitry. The apparatus can be an intermediate device as discussed above, such as a memory controller, for receiving memory access commands (for example from processing circuitry) and passing those memory access commands on to a memory device (such as a dynamic random access memory, DRAM).

The interface circuitry is configured to receive the aforementioned memory access commands, which are directed to the memory device and may for example be received from processing circuitry. Each memory access command specifies a memory address to be accessed.

The scheduler circuitry is configured to store a representation of a plurality of states accessible to the memory device. Example states include a state in which the memory device is powering up, an idle state in which memory access commands are awaited, states associated with charging particular memory banks, states associated with reading from particular memory banks, and so on. The memory device can thus be considered to transition from state to state as it performs memory access operations. The representation may for example be a state machine representation of the plurality of states accessible to the memory device. This may comprise a complete representation of states available to the memory device, such that any possible series of operations performed by the memory device can be expressed as a path through the state machine.

The scheduler circuitry is further configured to, based on the representation, determine an order for the received memory access commands. The scheduler can thus take into account the states available to the memory device, including for example the potential paths that the memory device could traverse through the states whilst performing the received memory commands, when determining the order. For example, the scheduler could determine the order to minimise the overall time to perform the received commands. This minimisation may for example be performed by determining an overall performance time associated with each of a number of potential orders, and then selecting the order with the lowest overall performance time.

Alternatively or additionally, the scheduler may determine the order based on one or more constraints. These constraints may be associated with operational limitations of the memory device. For example, where the memory device is a DRAM, the constraints may be associated with a non-uniform access latency associated with banks of the DRAM. These operational constraints can thus be taken into account in the determination of the order. As another example, a constraint may be a deadline by which a given memory access command is to be issued to the memory device: it can thus be ensured that the given memory access command will not be delayed by more than is deemed acceptable.

The memory device may have a non-uniform access timing characteristic such that a time taken to access a memory address is dependent on preceding access activity within the memory device; the representation may then include a representation of the non-uniform access timing characteristic. For example, where the memory device is a dynamic random access memory, the non-uniform access timing characteristic may be the aforementioned non-uniform access latency associated with banks of the dynamic random access memory. The non-uniform access timing characteristic can thus be taken into account when determining the order, thereby improving the degree to which the order can be optimised relative to comparative systems in which this is not taken into account.

The dispatch circuitry is configured to receive the received memory access commands from the scheduler circuitry, and to issue the received memory access commands, in the determined order, to be performed by the memory device.

The apparatus is therefore operable to take into account the states accessible to the memory device, and dynamically apply this to the particular memory access commands that are received, in order to determine an order for the commands. This improves memory performance, for example by reducing the overall time to perform the memory access commands and thereby improving throughput, and by reducing the proportion of issued memory access commands which cannot be performed (for example because they violate one of the above-mentioned constraints).

In an example, the representation of the plurality of states comprises a representation of a plurality of potential transitions between pairs of the plurality of states. This may include an expected time duration associated with each of the plurality of potential transitions. The representation can thus accurately reflect the potential routes that can be taken through the plurality of states, including the time taken for each such route.

In one such example, the representation is implemented as a directed graph. Each state of the plurality of states corresponds to a node of the directed graph, and each potential transition of the plurality of potential transitions corresponds to an edge of the directed graph. An efficient and effective way of storing the representation is thereby provided.

In an example, the scheduler circuitry is configured to determine the order for the received memory access commands by, based on the representation, testing a plurality of potential orders for the received memory access commands to determine at least one optimisation parameter for each potential order. The scheduler circuitry then determines the order as one of the potential orders which optimises one or more of the at least one optimisation parameters. Example optimisation parameters include a total estimated time duration associated with each potential order, and a total estimated power consumption associated with each potential order. The order can thus be flexibly determined based on whichever parameters are desired to be optimised. The optimisation could be based on more than one parameter such that, for example, an order with acceptable (but not low) time duration and acceptable (but not low) power consumption is selected over an order with very low time duration but unacceptably high power consumption (or, similarly, an order with very low power consumption but unacceptably high time duration).

The scheduler may be configured to test the plurality of potential orders by iterating through states of the representation such that, for each iterated state, the scheduler determines a next state to optimise one or more of the at least one optimisation parameters. This process can then be repeated until the order has been determined. Whilst this may not provide the absolute optimal order overall, it is an efficient way to determine an order that is at least somewhat optimised. An order with acceptable values of the optimisation parameter or parameters can thus be determined without testing every possible order (or every possible path through the state representation to perform all of the received commands).

In an example, the determining of the order for the received memory access commands comprises sequentially determining an order for each of a series of subsets of the received memory access commands, each subset comprising a number of memory access commands equal to or less than a predefined maximum subset size. In this example, the dispatch circuitry is configured to sequentially receive each of the series of subsets. This provides an efficient method for ordering a continuous stream of commands, and also allows the apparatus to be implemented within a system which is already configured to process memory access commands by way of a series of fixed-size windows.

The scheduler circuitry may be configured to determine the order for a given one of the series of subsets based on a constraint determined when determining the order for a preceding one of the series of subsets. This allows more flexibility when assigning commands to a given subset. For example, a given command could be missed out of one subset on the condition that it is included in the next subset, to ensure that the given command is not excessively delayed. As another example, a given command could be included in one subset on the condition that a conflicting command (for example relating to the same memory bank, in systems in which a time delay is imposed between successive accesses to the same bank) is excluded from the next subset (or is excluded from, for example, a first slot of the next subset).

Example constraints therefore include a requirement that a given memory access request is included in a given location within the given one of the series of subsets, a requirement that a given memory access request is excluded from the given one of the series of subsets, and a requirement that a given memory access request is excluded from a given location within the given one of the series of subsets.

In an example, the apparatus comprises fault detection circuitry. In this example, the scheduler circuitry is configured to determine, based on the representation, an estimated time duration associated with performance of a subset of the received memory access commands. The fault detection circuitry is configured to determine that a difference between the estimated time duration and an actual time duration associated with performance of the subset exceeds a threshold. Responsive to determining that the difference exceeds the threshold, the fault detection circuitry signals a fault. The apparatus can thus provide improved fault detection, in addition to improving throughput of memory access commands, by detecting that time taken for the performance of the memory access commands differs unexpectedly from the amount of time that would be expected from the state representation.

In an example, the scheduler circuitry is configured to load the representation, during a boot process, as a static representation of the plurality of states accessible to the memory device. This allows the state representation to be efficiently stored, as the plurality of states available to a given memory device is not expected to change and thus the representation is not expected to change for a given memory device. Alternatively or additionally, in order to support multiple types and configurations of memory device the scheduler circuitry may be configured to determine the representation based on an indication, received from the memory device, of a configuration of the memory device. The apparatus can thus determine, for example at boot, which type of memory device it is connected to and then load the appropriate representation.

Examples of the present disclosure will now be described with reference to the Figures.

FIG. 1 shows schematically an apparatus 100 according to an example of the present disclosure.

The apparatus 100 comprises an interface 105 to receive memory access commands directed to a memory device (not shown in FIG. 1). These memory access commands may for example be received from client devices (not shown in FIG. 1), such as processor cores or other devices which are to access data stored in the memory device.

The apparatus 100 comprises a scheduler 110 to receive the memory access commands from the interface 105. The scheduler 110 stores a representation 115 of a plurality of states available to the memory device. As described in more detail elsewhere herein, the representation 115 may be a directed graph representing the potential transitions between states that may be made by the memory device, as well as characteristics associated with such transitions such as a time duration associated with each transition.

Based on the representation 115, the scheduler 110 determines an order for the received memory access commands. The execution of each memory access command is associated with one or more state transitions of the memory device. For example, in examples in which the memory device is a dynamic random access memory (DRAM), the execution of a read command may be associated with a transition from an idle state to a state of charging a DRAM bank in which the requested data is stored, followed by a transition to a state of reading the data and then a transition back to the idle state. The scheduler may for example test several potential orders, and then select the order which optimises an optimisation parameter such as the overall time to execute the received commands.

In addition, the scheduler 110 may apply constraints based on the nature of the memory device. For example, memory access may be subject to a number of timing parameters that constrain the permitted commands that can be performed. The scheduler 110 may determine the order in a manner that abides by these constraints. The constraints may for example be loaded at boot time: the scheduler 110 can determine the particular memory device to which it is connected, and load the constraints for that device.

The apparatus 100 further comprises a dispatcher 120. The dispatcher 120 receives the memory access commands from the scheduler 110 and issues the received commands, in the order that was determined by the scheduler 110, to be performed by the memory device. The dispatcher may, in some examples, enforce strict compliance with the above-mentioned constraints (such as timing constraints) associated with the memory device.

Figure 2:
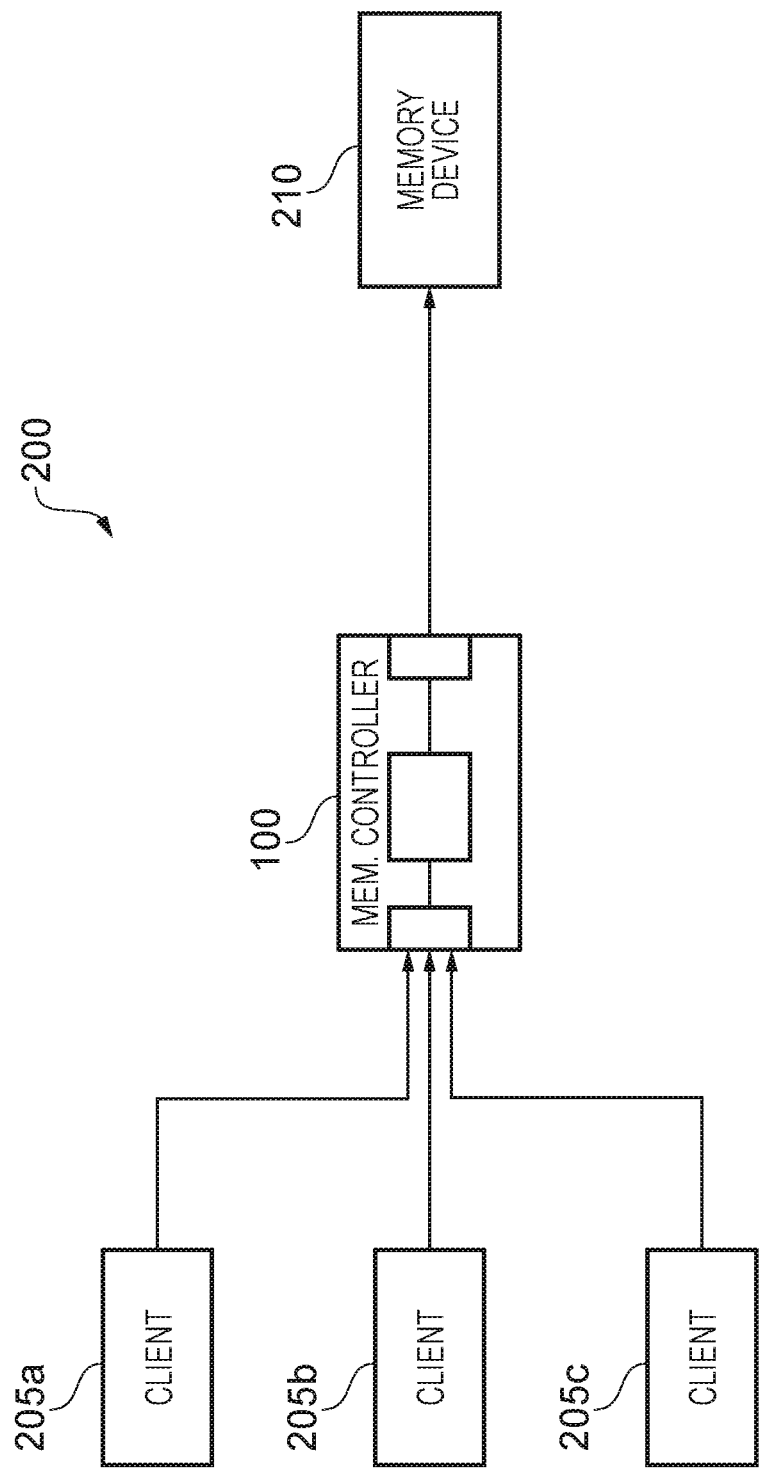

FIG. 2 schematically illustrates a system 200 according to an aspect of the present disclosure.

The system 200 comprises a plurality of client devices 205a-c. Although three client devices 205a-c are shown, this is purely for illustrative purposes: in other examples, the system may comprise more client devices or fewer client devices (for example a single client device). The client devices, which may for example be processor cores or other devices which have cause to access stored data, issue memory access commands in respect of such data.

The system 200 comprises a memory device 210 in which the requested data is stored. For example, the memory device 210 may comprise one or more DRAM devices.

The memory access commands are received by a memory controller 100, which is configured as the apparatus 100 of FIG. 1. The memory controller 100 determines an order for the received commands and issues the commands, in that order, to the memory device 210 as described above in relation to FIG. 1.

Each client 205a-c may have a corresponding criticality value, indicating the relative importance of the execution of the commands of that client. Each client 205a-c may also have performance targets, such as a target bandwidth and/or a target latency (for example a desirability for real-time latency, such that all commands are processed within a given time limit). Such targets may be defined as absolute requirements (for example if a client cannot function without real-time latency) or as non-essential desirables. In such examples, the memory controller 100 can take these parameters into account to determine which client(s) 205a-c to prioritise when determining the order in for the received commands. For example, memory access command bandwidth may be allocated in the following order of priority, from highest to lowest:

Highest criticality client not achieving target bandwidth, with real-time latency desire;
Highest criticality client not achieving target bandwidth;
Lower criticality client not achieving target bandwidth, with real-time latency desire;
Lower criticality client not achieving target bandwidth;
Any client achieving target bandwidth, with real-time latency desire;
Any client achieving target bandwidth;
Any client exceeding target bandwidth;

The memory access commands of each client 205a-c can thus be ordered by the memory controller 100 to balance the available bandwidth across the clients 205a-c as appropriate. The desired service levels (including criticality, target bandwidth/throughput, etc) may be directly negotiated between the clients 205a-c and the controller 100 or, alternatively, may be defined by another device (not shown) acting as an arbiter.

Figure 3:
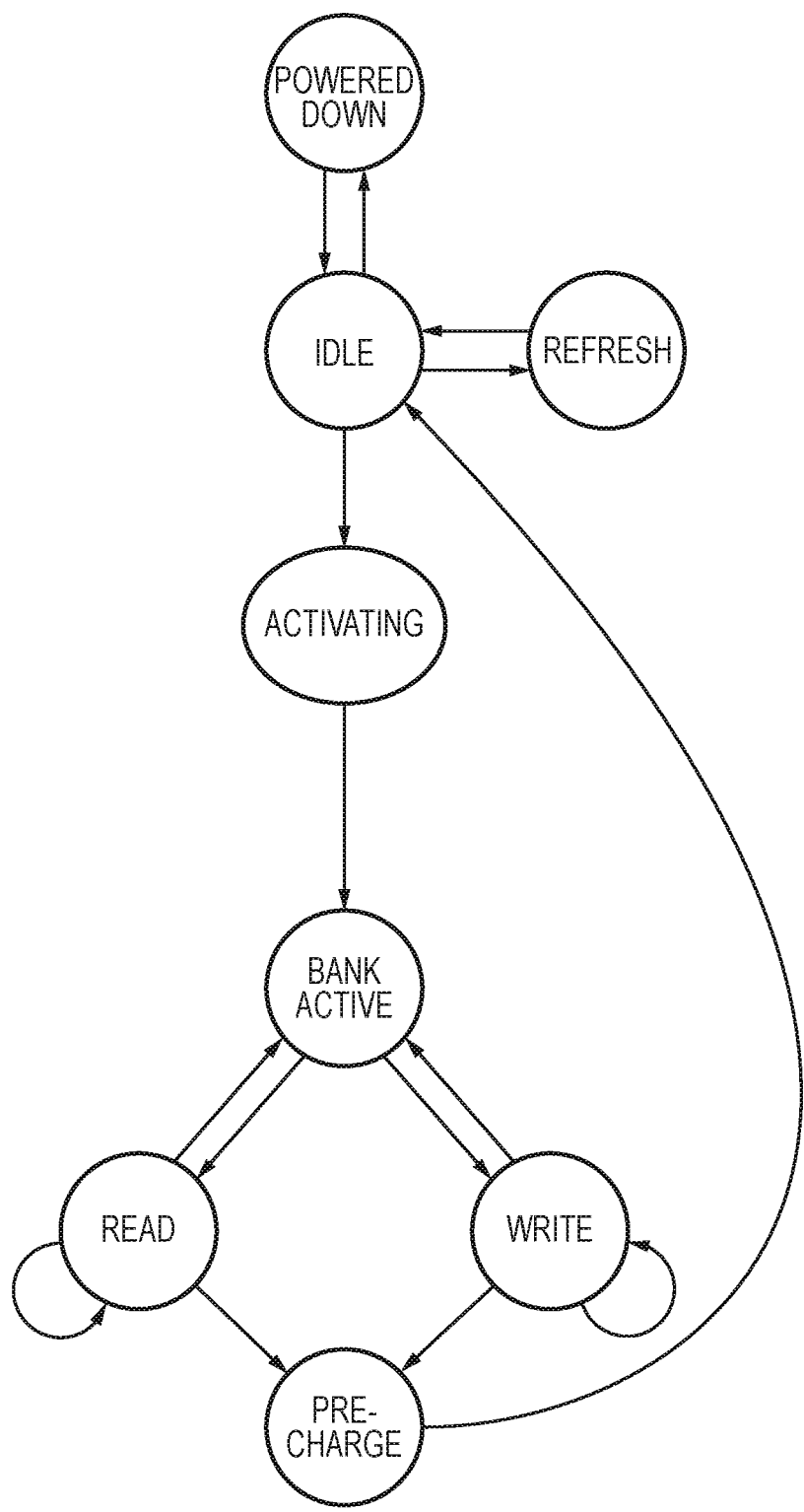
FIG. 3 shows a directed graph illustrating states available to an example memory system, and also potential transitions between these states.

As mentioned above, the representation 115 of memory device states stored by the controller 100 may be a directed graph. FIG. 3 shows an example of such a graph for a DRAM system in which a memory bank is activated before data can be read or written from/to that bank. Each state is represented as a circle, with arrows denoting potential transitions between states. A time duration is associated with each transition.

At the top of the graph is a powered down state in which the DRAM is inactive. From this state, the DRAM can be powered up into an idle state.

From the idle state, the DRAM can be powered back down, to return to the powered down state. The DRAM can also be transitioned to a refresh state in which one or more areas of memory are refreshed, for example during periodic maintenance. Following completion of the refresh, the DRAM transitions back to the idle state. Finally, from the idle state, a bank of the DRAM can be activated.

To activate a bank of the DRAM, the DRAM is transitioned to an activating state in which the activation process is performed. The DRAM is then transitioned to a state in which the bank in question is active.

From the active state, data in the active DRAM bank can be read by transitioning the DRAM to a read state. From the read state, further reads can be performed or the DRAM can be returned to the active state to await another operation in respect of the active bank. Similarly, data can be written to the active bank by transitioning the DRAM to a write state. From the write state, further writes can be performed or the DRAM can be returned to the active state to await another operation in respect of the active bank.

Following a read or write operation, if no further operations are to be performed in respect of the active bank, the DRAM can be transitioned to a pre-charging state in preparation for returning to the above-mentioned idle state. The DRAM is then transitioned back to the idle state.

A given series of read and/or write commands in a particular order can be expressed as a path through the state diagram of FIG. 3. The overall number of transitions to perform such a series of commands can depend on the particular order. For example, if two read operations (operation A and operation B) are to be made to one bank, and one read operation (operation C) to another bank, two potential orders are A, B, C and A, C, B. Starting from the idle state, these orders incur transitions as follows:

A, B, C: Idle—activating first bank—first bank active—read A—read B—pre-charge—idle—activating second bank—second bank active—read C.

A, C, B: Idle—activating first bank—first bank active—read A—pre-charge—idle—activating second bank—second bank active—read C—pre-charge—idle—activating first bank—first bank active—read B.

The A, B, C order thus incurs fewer transitions, and thus might be expected to be less time-consuming, than the A, C, B order. The memory controller 100, when determining an order for the received commands, may thus determine the time duration associated with each of these orders and optimise the overall duration by selecting the A, B, C order. This provides an improvement over comparative systems in which, for example, commands are performed in the order in which they are received: in such a system, if the above-described commands were received in the A, C, B order, they would be issued performed in that order. Conversely, examples of the present disclosure could re-order those commands into the A, B, C order and thereby improved overall performance.

Figure 4:
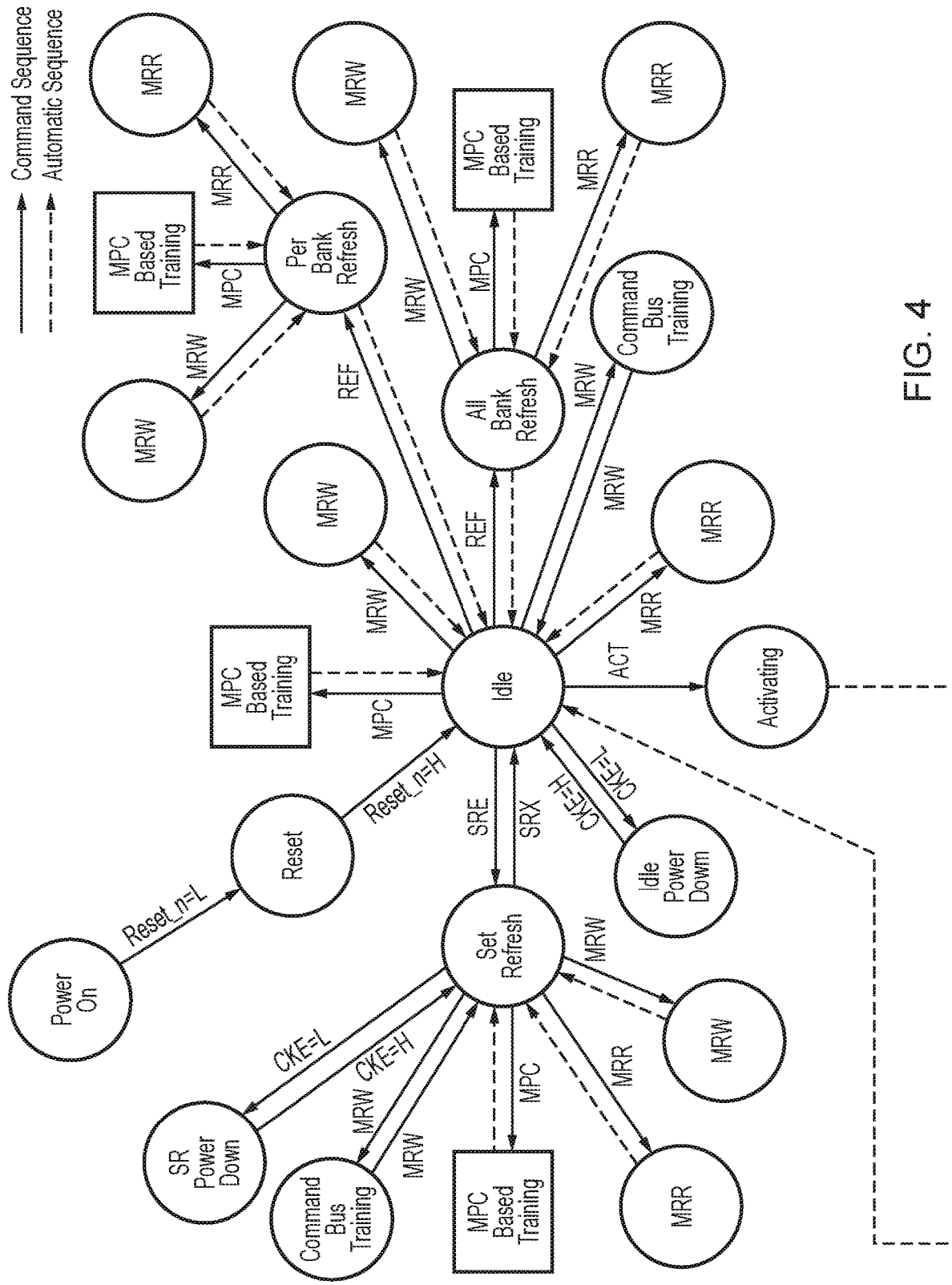
FIG. 4 shows a more complex directed graph illustrating states available to an example memory system, and also potential transitions between these states.
Figure 4:
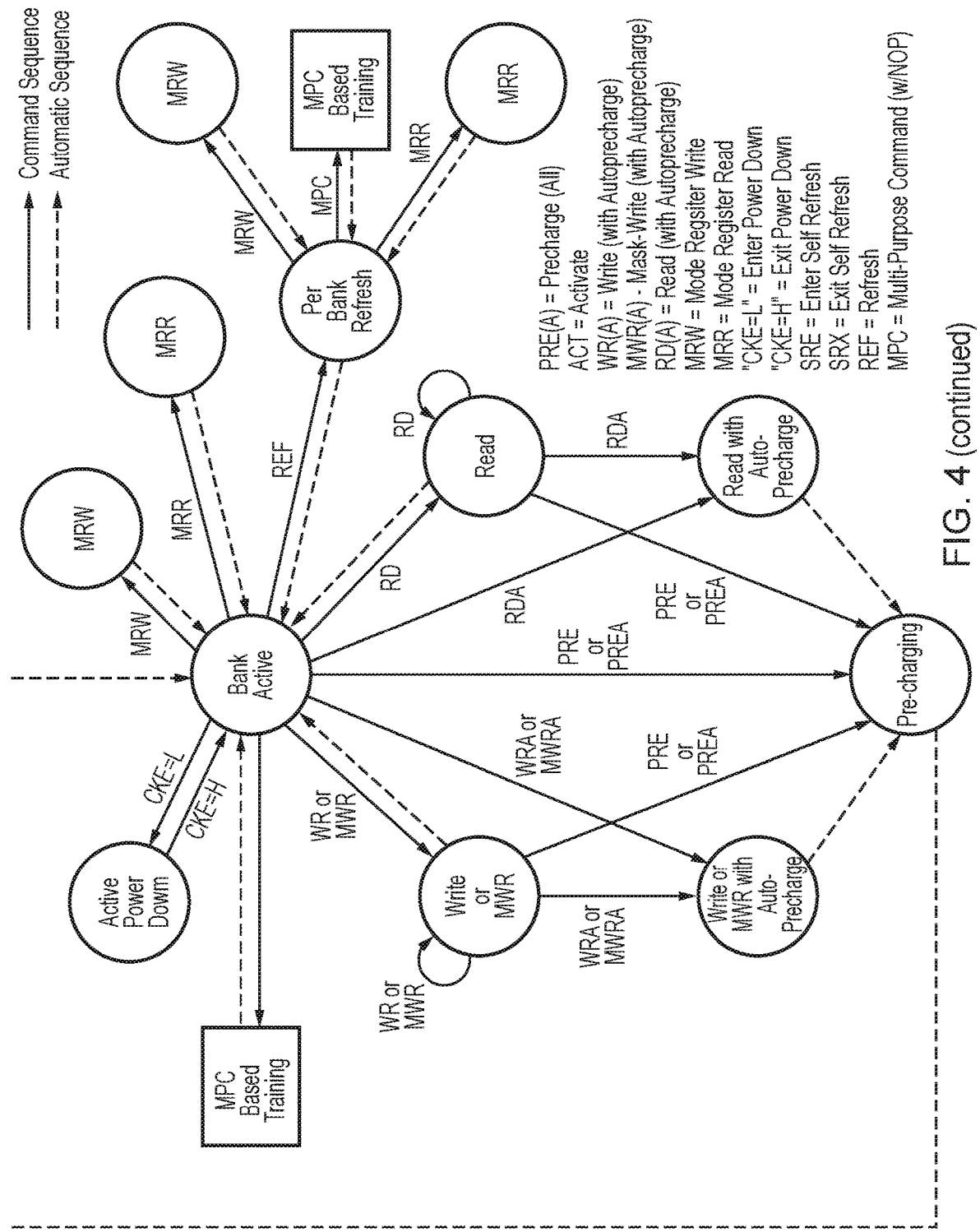

The diagram of FIG. 3 shows relatively few states, for the purposes of illustration. Some DRAM systems may have more complex state diagrams. FIG. 4 shows an example of a more complex state diagram for an example DRAM system. A full description of each of the states is not provided here but would be apparent to one skilled in the art. However, some of the states shown in FIG. 4 correspond to those described above in relation to FIG. 3 (such as idle, activating, bank active, read and write).

Figure 5:
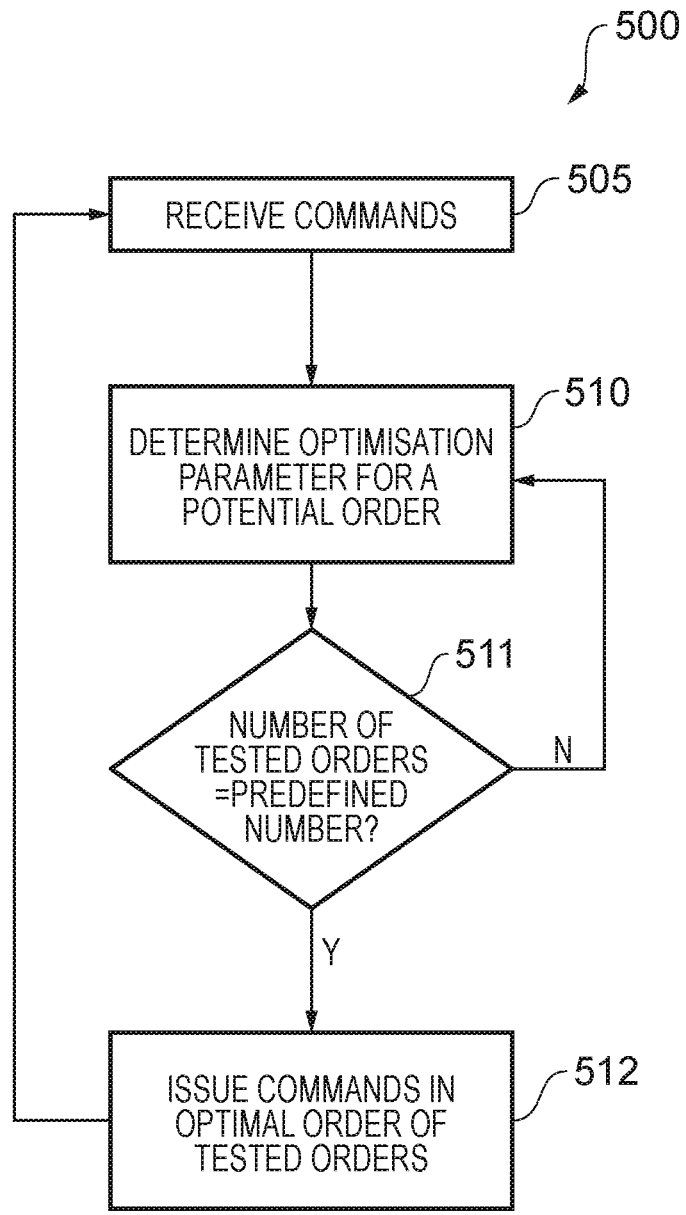
FIG. 5 is a flow diagram illustrating a method according to an example of the present disclosure.

FIG. 5 is a flow diagram illustrating a method 500 according to an example of the present disclosure. The method 500 may for example be carried out by a memory controller such as the controller 100 described above with reference to FIGS. 1 and 2.

At block 505, a number of memory access commands are received. As described elsewhere herein, the commands relate to memory operations to be performed by a memory device. In some examples, the orders of commands are determined in subsequent windows of a given number of slots. For example, the window size may be 8, such that the first eight commands are ordered, followed by the next 8, and so on. In some examples, not all slots in a given window need be filled. For example, a given window may have alternative slots filled such that it includes only four commands.

At block 510, an optimisation parameter is determined for one potential order of the received commands. For example the optimisation parameter may be a total time duration associated with each potential order and/or a total estimated power consumption associated with each potential order. In other words, the potential order is tested in terms of the optimisation parameter. The potential order may be determined randomly, or by other methods such as that discussed below with reference to FIG. 6. The optimisation parameter may be determined by traversing a representation of states available to the memory device, such as those described above with reference to FIGS. 3 and 4.

At block 511, it is determined whether the number of tested orders is equal to a predefined number (at the first instance of block 511, the number of tested orders will be 1). The predefined number may be equal to the number of potential orders of the received commands (i.e. N!, where N is the number of received commands). Alternatively, for example where the number of commands to be ordered would make this prohibitively large, the predefined number may be less than the total number of potential orders.

If the number of tested orders is less than the predefined number, flow returns to block 510 and another potential order is tested.

If the number of tested orders is equal to the predefined number, flow proceeds to block 512 where the commands are issued in the optimal order (out of the set of tested orders). For example, where the optimisation parameter is the total time duration associated with performance of the received commands, the optimal order may be determined as the one of the tested orders which has the lowest total time duration.

Flow then returns to block 505, where further commands are received, and the method 500 is repeated.

Figure 6:
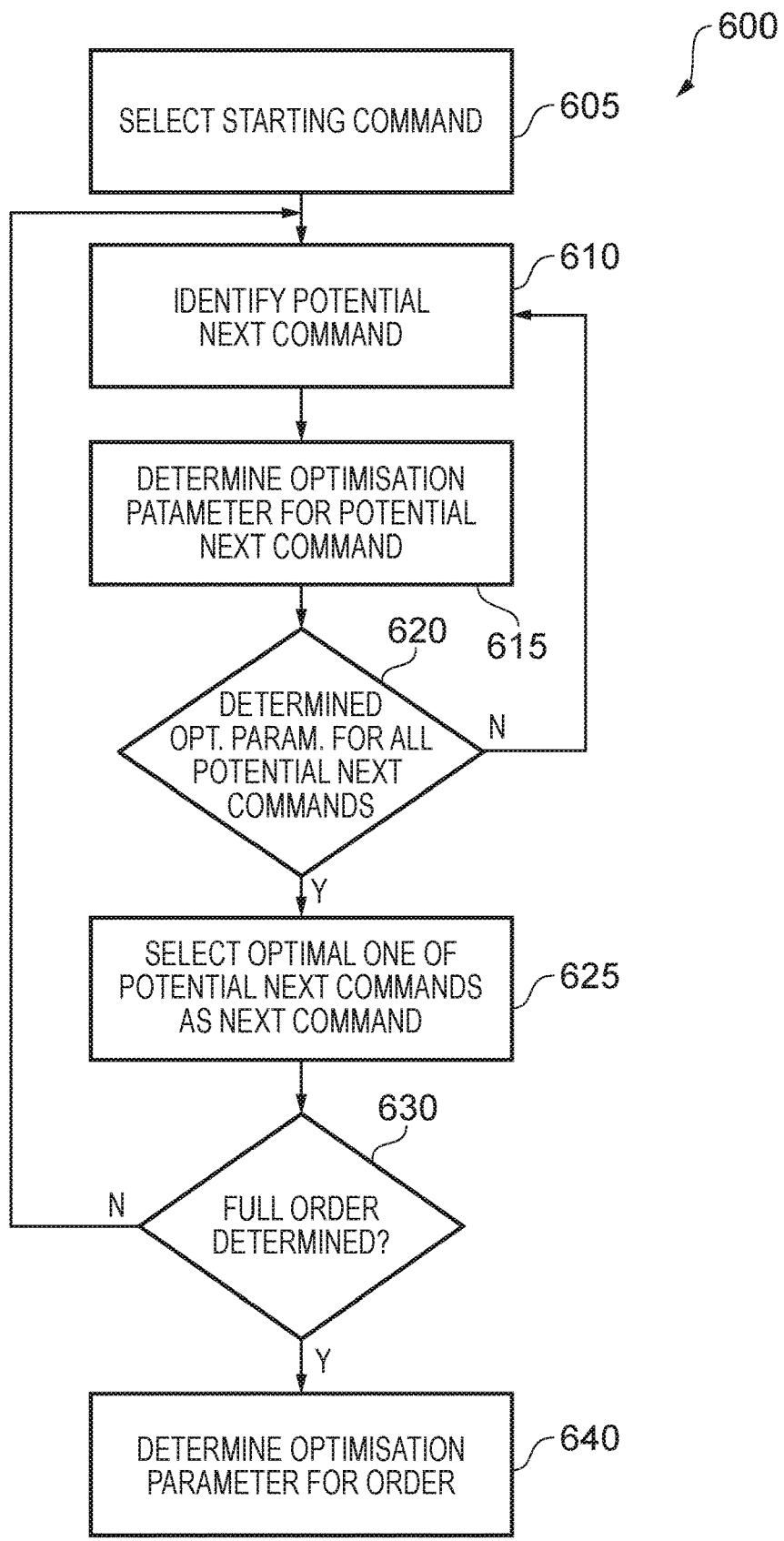
FIG. 6 is a flow diagram illustrating a method according to an example of the present disclosure.

FIG. 6 is a flow diagram showing a method 600 showing a method for determining an order of memory access commands, and then determining a value of an optimisation parameter for that order. For example, the method 600 may be implemented within block 510 of FIG. 5.

The method 600 begins at block 605 by determining a starting command for the order. This may be determined randomly, or based on factors such as for example the initial state of the memory device. For example, where a given DRAM rank is active, preference may be given a command in respect of a memory location within that rank.

At block 610, a potential next command is determined, for example randomly.

At block 615, a value of an optimisation parameter (for example as discussed above) is determined for the potential next command. For example, where the optimisation parameter is a time duration, the time duration associated with the performance of the potential next command may be determined.

At block 620, it is determined whether such an optimisation parameter has been determined for all potential next commands. If not, flow returns to block 610, and another potential next command is identified. Once values of the optimisation parameter have been determined for all potential next commands, flow proceeds to block 625.

At block 625, the optimal one of the potential next commands is selected as the next command. For example, where the optimisation parameter is a time duration, the next command may be selected as the command with the lowest time duration. As explained above, this time duration can depend on the state of the memory device. For example, if a given DRAM bank is already active, an access to that bank will have a shorter duration than an access to another bank.

At block 630, it is determined whether the full order has been determined for the received commands. If not, flow returns to block 610, where a potential next command is identified and the process repeats.

If the full order has been determined, flow proceeds to block 640 where a value of the optimisation parameter is determined for the entire order. This process can then be repeated to determine other potential orders, for example as shown in block 510 of FIG. 5.

The method 600 thus provides an efficient way of determining a potential order and the associated optimisation parameter value, by iterating through the received commands to determine the next command, and then the command after that, and so on until the order has been determined.

A further example implementation, in which the memory device is a DRAM, will now be described.

In example DRAM systems, periodic maintenance (dynamic refresh of data cells) is performed to preserve data integrity. This is defined as spending of a certain amount of time (tRFC) performing refreshes every tREFi units of time. The timebase for the present example, which can be termed the Service Interval, can thus be defined to be tREFi long. Within this interval, the longer timebase can be divided into useful windows that can be allocated for performing work for a given client. These can be referred to as Service Allotments, or Allocation Windows.

In the present example, an Allocation Window can notionally offer a client sole use of the memory device for that period of time. This does not necessarily translate immediately into an absolute bandwidth; the availability of the resource has merely been divided, with a subset of time offered to each Client. In order to provide predictability (at least of minimum predictable service), these Allocation Windows may be required to be non-interfering. This means that work done in each window does not preclude work done by another client in the next window(s).

For DRAM, the fundamental shared resource is the memory bank. Each address in memory maps onto a single bank of memory. The nature of DRAM means that accessing different addresses in a single bank can involve cycling through a series of operations to retrieve the correct row, or page, of data values, for example as described above with reference to FIG. 3. The rate at which a bank can be cycled is limited by the Row Cycle time, tRC. In order for one window to not interfere with a subsequent one, windows can therefore be defined to be at least tRC in duration. In the present example, an Allocation Window duration of tRC is used.

An example of the populating of such allocation windows will now be described.

With the present example of bank interference, it can be seen that within a window each bank might only be accessed once, in order that the use of the target bank is not extended in such a way as to encroach on the subsequent window.

A single access to DRAM involves a column access to transfer data to a single set of cells. The duration of these commands is referred to as the Command to Command delay (tCCD).

An example of populating an Allocation Window is therefore to divide the Allocation Window into unit burst accesses to see how many can be performed within the window. For example, an example DRAM device may have 8 banks, with tRC being roughly 8*tCCD.

Therefore, an allocation window can represent the opportunity to perform one access to each bank of a rank of memory. Thus the minimum predictable service offered is one access per window (to allow for the worst case where a client continuously targets a single bank).

Since this example process only inherently guarantees a single unit of work to be done per allocation, a window does not, in its entirety, need to be exclusively assigned to a single client. The intended client can thus be given preferential consideration when populating a window in order that—for the case where a client (and the system) can deliver of suitably grouped requests—policies can be built that offer increased guarantees.

The allocation window can therefore be populated according to the ability of the memory device to process requests. For the present example, account is not taken of the fact that a memory request may ultimately require multiple commands to carry it out and it is assumed that the dispatcher will have sufficient command capacity to issue the requisite commands in a pipelined fashion to achieve the target throughput etc. Two further assumptions are made, for the present example, to support this:

It is assumed that the raw interface command issuing rate, relative to the data interface capacity and processing rate, is known a priori, and further that the relationship between commands and the load they place on both these interfaces is understood. Therefore it is built into the present example that command capacity is not fundamentally the limiting factor in the ability to process a window (for example, a command may require an ACTIVATE, READ/WRITE, PRECHARGE command sequence, and will occupy 2, 4 or 8 cycles of data interface. Therefore the 2-cycle case may be limited by command rate. For these cases use may be made of command stacking—which in some examples is supported by the memory protocol—that allows a precharge to be issued concurrently with the READ/WRITE command. In some examples, this would only be possible for repeated accesses to the same row in memory, which would obviate the need for ACTIVATE commands per access, thus command bandwidth would be recovered).

It is assumed that the scheduler, operating elastically in time with respect to the dispatcher, can "run ahead" of the dispatcher to the extent that it may fill the execution pipe in the Dispatcher in order that it has sufficient visibility of requests to perform the pipelining. This policy can be exploited later to mitigate some timing parameters (e.g. tFAW), that would otherwise restrict options within a single window. As an illustration; analysis of LPDDR4 memory yields that an execution pipe of two windows lead will give sufficient flexibility for this kind of behaviour. It is noted that such behaviour leads to an initial "start-up" delay, which must be considered when calculating latency values. This latency can be expressed as 1 or 2 allocation windows. Furthermore, such consideration may, in some examples, only be made in the case of a lightly loaded or empty queue. A similar treatment of this can be made for bandwidth accounting—if the pipe should empty the next window may be assigned to an "unused" bin (which might also be considered as a "low-power" bin if a window can be constructed that can enter and exit a low-power state in a non-interfering way).

Thus, a window is to be populated with data operations. In the present example, a window to be comprised of 8 slots is to be filled with data operations. One example of a fully populated window is our original example of an access to each bank.

For these commands, it can be seen from inspecting the DRAM state machine (e.g. FIG. 4) and timing tables (i.e. time duration associated with each potential transition of FIG. 4) that the budget for each slot is equivalent to tBURST (tCCDs) cycles. The other key timing parameters to consider are tRAS and tRCD, which together dictate the minimum time between an ACTIVATE and a corresponding PRECHARGE. For the present example, they also form an effective maximum time as they also defined to be tRC—tRP (tRP being the time between a PRECHARGE and the next ACTIVATE)—therefore giving a deadline for handing over the resource to the next window.

Figure 7:
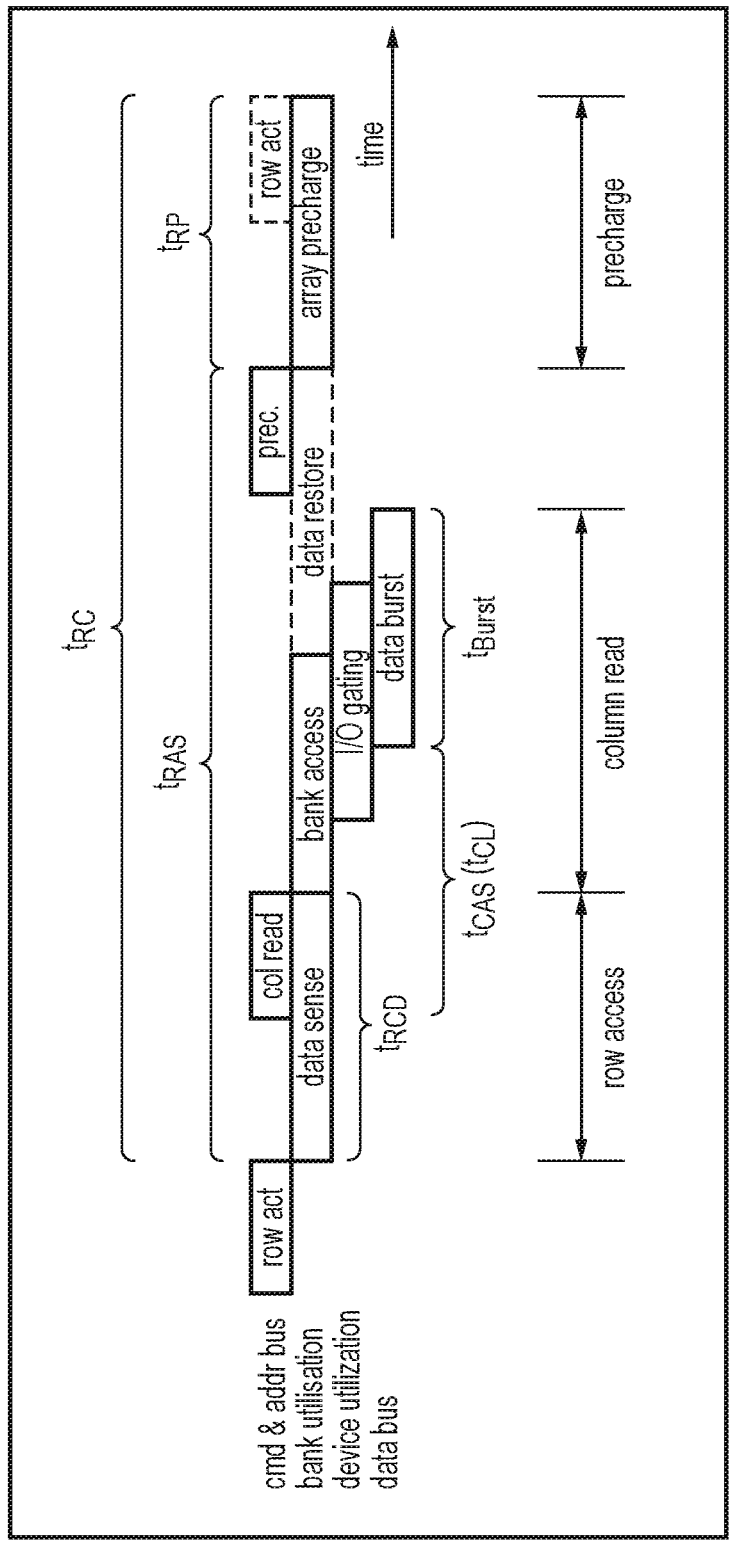
FIG. 7 illustrates the interrelationship of timing parameters associated with operation of an example DRAM system.

The interrelationship between some of these timing values is shown in FIG. 7.

Thus, once a data access has been performed, it may be enforced that further accesses to the same bank are only performed in the subsequent (tRAS-tRCD)/tCCDs slots to remain non-interfering. An optimisation here may be to allow multiple-allocation of neighbouring windows such that chained sequences can be built to exploit streaming clients.

Thus, rules can be applied to enforce the non-interference, and there are attributes of the resource (memory device) from which sequences (orders of commands) can be built. The banks in a memory can be considered as a database of states, where the legal state transitions can be mapped as a graphed database such as the graph of FIG. 4 where each edge of the graph—caused by issue of a command—is described as a link in that database. The weight of that link can be described as the delay (i.e. duration) caused by the command (similarly, other attributes of the sequence can be tracked by, in parallel, calculating other properties of the link such as work done, and power consumed—thus, in some examples, multi-dimensional decisions relating to the sequence can be made). By only considering data operations, the graph of FIG. 4 can be simplified such that it is tractable to illustrate a 4-bank graph as depicted in FIG. 8.

Figure 8:
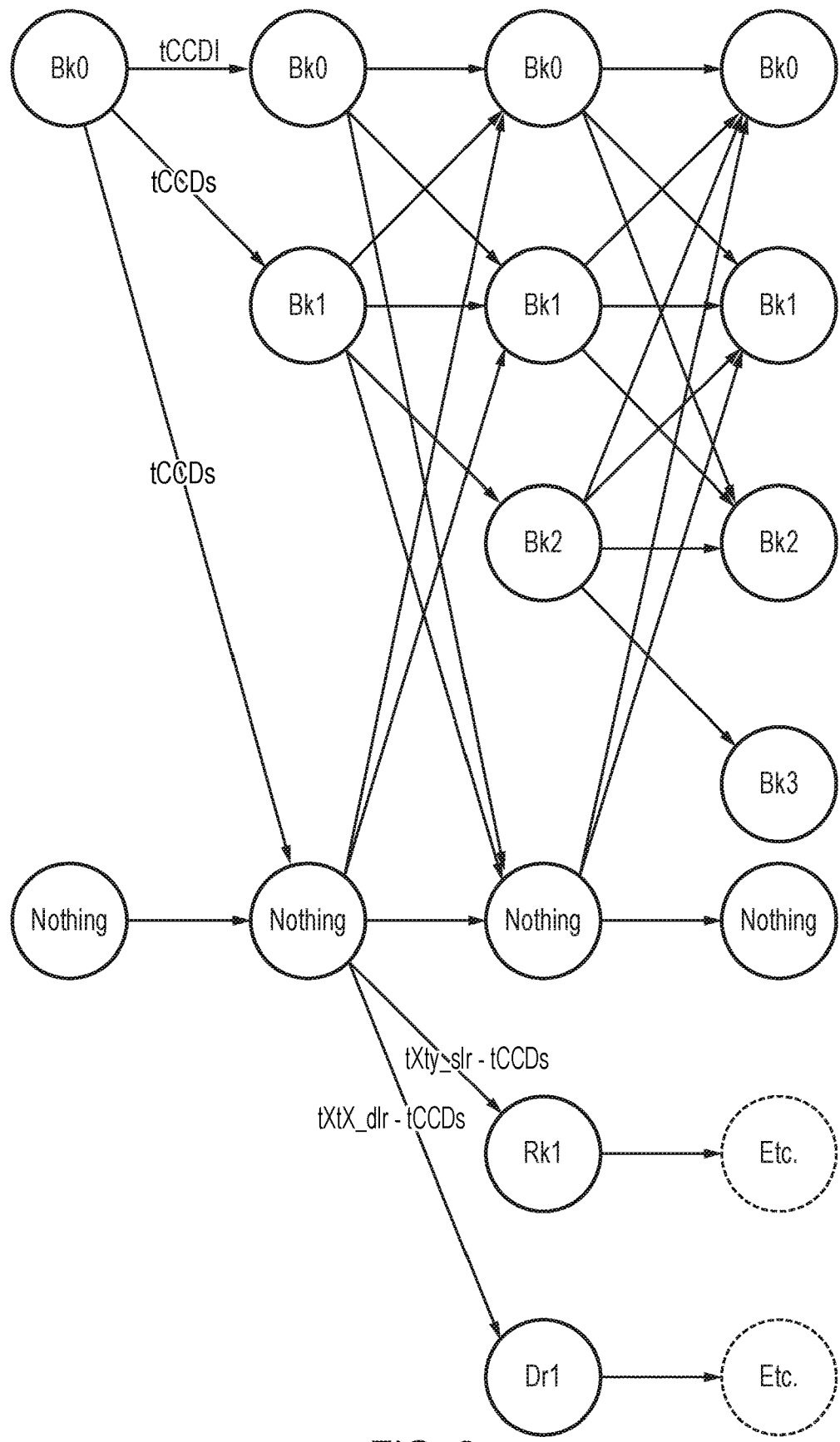
FIG. 8 shows a directed graph illustrating state transitions available to an example 4-bank DRAM system.

In the graph of FIG. 8 it can be seen that for each slot/bank the legal number of potential routes through the graph grows exponentially. Were templated routes through this graph to be statically determined, the scheduler could require significant storage and complexity to attempt to match queue population to a given template, and thus the number of templates would be limited. This would potentially lose the ability to fill all slots with useful work. By considering the routes as a graph database the scheduler can iterate through each slot, for example as described above with reference to FIG. 600, and select from matching links at each node. This offers the ability to maximise chances of selecting the most efficient route.

At each node (iteration), various links may be present as options for graph traversal. The relative merit of each option can be determined through analysis of the attributes of that link—namely work done, time taken, power consumed. Further system factors may also be taken into account, such as age and priority (latency sensitivity) of a request. The exact deliberation amongst the factors, for example their relative weighting, can be defined within a given implementation and still achieve the bandwidth goals of the system. Such a policy can be implemented with user or client configurability such that this can be determined at the system or client level. In examples in which system performance is critical, maps taken may be recorded in such a way as to "learn" which clients use which maps, and potentially offer tuning (or prevention) of certain maps in particular. For instance, if a client wanted to ensure certain maps were used preferentially—e.g. to achieve a stream of accesses—in order to preserve a target work done by allocation (rather than a system policy to optimise for avg. latency), this could be offered.

Figure 9:
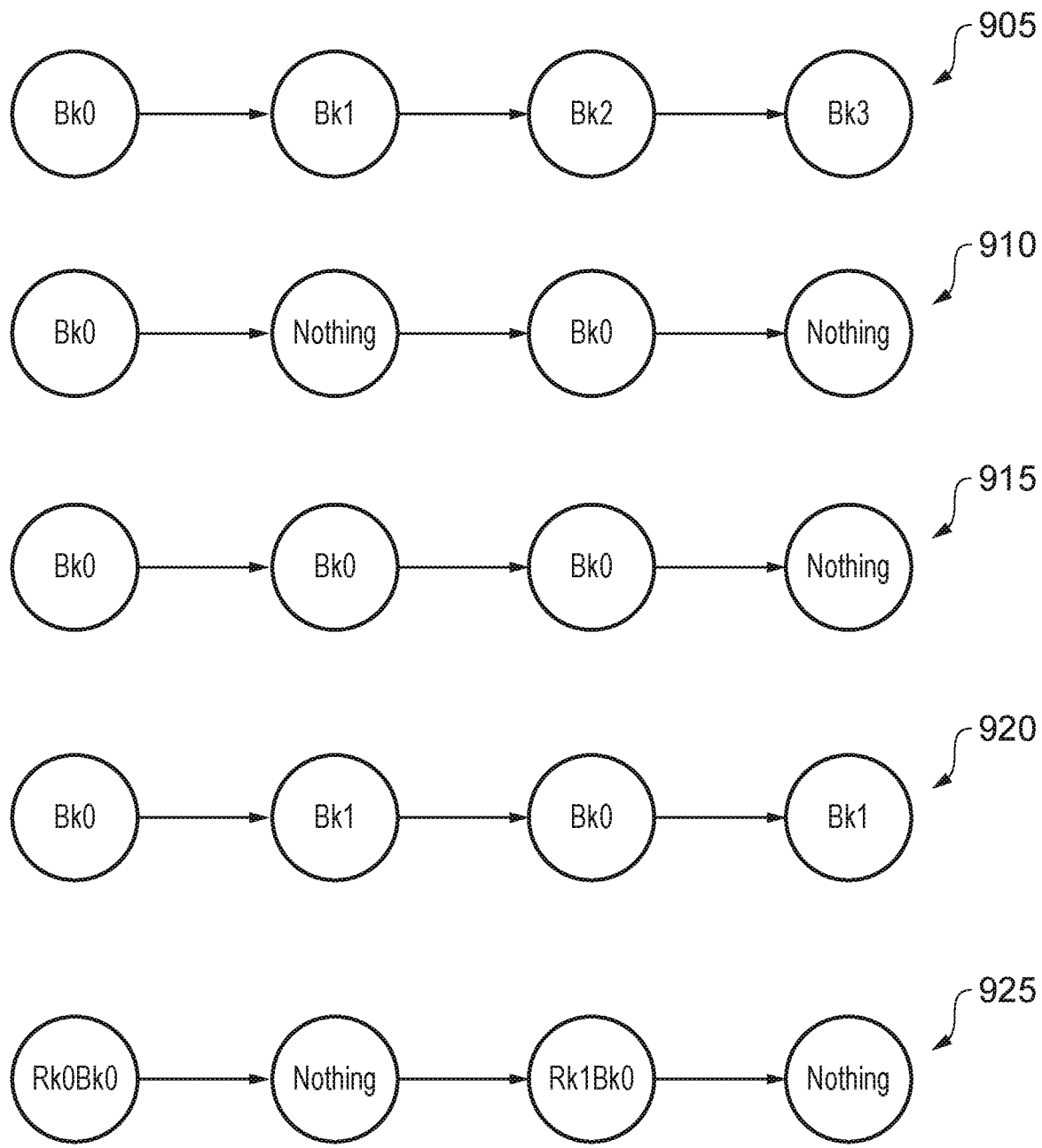
FIG. 9 illustrates particular examples of routes through the graph of FIG. 8.

FIG. 9 illustrates particular examples 905-925 of routes through the graph of FIG. 8. Each corresponds to a potential order of memory access commands.

In route 905, each slot is filled with an access to a new bank. Each link incurs a time duration of tCCDs and all slots are utilised. 4 new banks are accessed and so the power units used are 4.

In route 910, the same bank is targeted repeatedly but for this memory device tCCDl>tCCDs and so consecutive slots cannot be populated. The interim slots are thus unused.

Route 915 corresponds to a different type of DRAM to that of route 910, in which tCCDl==tCCDs and thus consecutive accesses can be issued to the same bank. However, the last slot remains un-utilised because of the tRAS restriction.

In route 920, two commands are to be issued in respect of bank 0 and two in respect of bank 1. These could thus be ordered 0, 0, 1, 1 or 0, 1, 0, 1. If the tCCDs restriction applies (as for route 910), the 0, 0, 1, 1 order is not permitted and thus the 0, 1, 0, 1 order may be selected so that all slots are filled. However, if the tRAS restriction is considered (as for route 915), the 0, 0, 1, 1 order may be preferred so that bank 0 can be deactivated as early as possible. The selection can thus be made based on the specific characteristics of the memory device in question.

Finally, route 925 illustrates how slots can be used to achieve a turnaround. This could be used to perform a read-modify-write or similar sequence, but could also be used to issue requests to a number of ranks. In this example, the turnaround requires the second and fourth slots to be left unused.

Each of these sequences can be constructed by considering rule-sets at each node, and searching the queued requests for legal requests as described above. The rules dictate which links are legal (e.g. time taken<tCCDs), and the merit of one link over another can be determined using a variety of methods as discussed elsewhere herein, but most generically whether the bank has been accessed previously—here a priority tree based on the original allotment order of bank access may provide the best chance of completing fewest new-bank activations whilst completing maximum number of accesses to each bank before the tRAS restriction applies.

With reference to the empty slots in the above, doing "nothing" does not necessarily imply wasted bandwidth. In this example, the scheduler creates a batch of requests to the dispatcher based on the filled slots. It tracks allocation windows in real time whilst counting windows used against those available. The dispatcher will complete the requests as soon as possible, thus removing the quantisation effect of considering slots rather than precise timings at the scheduler. The scheduler can track fulfilment by observing completion notifications from the dispatcher. If it receives sufficient completion notifications to realise it has gained enough slots to form a new allotment, it can add an allotment back onto the "available" pile, for best-effort re-distribution to a client. In this way the system as a whole can be work preserving.

Conversely, if the dispatcher encounters a fault, the scheduler can determine an overflow and start deleting allotments from the available. Such tracking can be used to monitor system state and potentially avoid/mitigate/detect potential loss-of-service issues.

The above-described graph representation can be extended to include notions of power management, maintenance (refresh, training, data-scrub, status polling) etc., such that a more detailed memory management profile can be considered.

Through use of the above described techniques, it will be appreciated that methods and apparatus are provided for scheduling memory access commands to be performed by a memory device. As described herein, the disclosed methods and apparatus provide improved system performance in comparison with some comparative systems in which the present disclosure is not implemented. Methods described herein may be performed in hardware and/or software. Such hardware may be a general-purpose processor, or a more specific unit such as an application-specific integrated circuit or a field-programmable gate array. For example, the components of apparatus 100, described above with reference to FIG. 1, may be dedicated circuitry components or functional aspects of more general-purpose circuitry.

Although illustrative examples of the invention have been described in detail herein with reference to the accompanying drawings, it is to be understood that the invention is not limited to those precise examples, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
   interface circuitry configured to receive memory access commands directed to a memory device, each memory access command specifying a memory address to be accessed;
   scheduler circuitry to:
      store a representation of a plurality of states accessible to the memory device; and
      based on the representation, determine an order for the received memory access commands, and
   dispatch circuitry configured to:
      receive the received memory access commands from the scheduler circuitry; and
      issue the received memory access commands, in the determined order, to be performed by the memory device;
   wherein the representation comprises a representation of a plurality of potential transitions between pairs of the plurality of states, wherein the plurality of potential transitions includes a potential transition between at least one state and each of at least two other states;
   wherein the representation is implemented as a directed graph, such that each state of the plurality of states corresponds to a node of the directed graph and each potential transition of the plurality of potential transitions corresponds to an edge of the directed graph;
   wherein the scheduler circuitry is configured to determine the order for the received memory access commands by:
      based on the representation, testing a plurality of potential orders for the received memory access commands to determine at least one optimisation parameter for each potential order;
      determining the order as one of the potential orders which optimises one or more of the at least one optimisation parameters; and
      wherein the scheduler is configured to test the plurality of potential orders by iterating through states of the representation such that, for each iterated state, the scheduler determines a next state to optimise one or more of the at least one optimisation parameters.

2. The apparatus of claim 1, wherein the representation comprises an expected time duration associated with each of the plurality of potential transitions.

3. The apparatus of claim 1, wherein the at least one optimisation parameter comprises at least one of:
   a total estimated time duration associated with each potential order; and
   a total estimated power consumption associated with each potential order.

4. The apparatus of claim 1, wherein:
   the determining of the order for the received memory access commands comprises sequentially determining an order for each of a series of subsets of the received memory access commands, each subset comprising a number of memory access commands equal to or less than a predefined maximum subset size;
   the dispatch circuitry is configured to sequentially receive each of the series of subsets.

5. The apparatus of claim 4, wherein the scheduler circuitry is configured to determine the order for a given one of the series of subsets based on a constraint determined when determining the order for a preceding one of the series of subsets.

6. The apparatus of claim 5, wherein the constraint comprises at least one of:
   a requirement that a given memory access request is included in the given one of the series of subsets;
   a requirement that a given memory access request is included in a given location within the given one of the series of subsets;
   a requirement that a given memory access request is excluded from the given one of the series of subsets; and
   a requirement that a given memory access request is excluded from a given location within the given one of the series of subsets.

7. The apparatus of claim 1, wherein the representation is a state machine representation of the plurality of states accessible to the memory device.

8. The apparatus of claim 7, wherein the state machine representation comprises a complete representation of states available to the memory device.

9. The apparatus of claim 1, comprising fault detection circuitry, wherein:
   the scheduler circuitry is configured to determine, based on the representation, an estimated time duration associated with performance of a subset of the received memory access commands; and
   the fault detection circuitry is configured to:
      determine that a difference between the estimated time duration and an actual time duration associated with performance of the subset exceeds a threshold; and
      responsive to determining that the difference exceeds the threshold, signal a fault.

10. The apparatus of claim 1, wherein the scheduler circuitry is configured to load the representation, during a boot process, as a static representation of the plurality of states accessible to the memory device.

11. The apparatus of claim 1, wherein the scheduler circuitry is configured to determine the representation based on an indication, received from the memory device, of a configuration of the memory device.

12. The apparatus of claim 1, wherein the scheduler circuitry is configured to determine the order for the received memory access commands subject to at least one constraint.

13. The apparatus of claim 12, wherein the at least one constraint comprises a deadline by which a given received memory access command is to be issued to the memory device.

14. A system comprising:
the apparatus of claim 1; and
the memory device.

15. The system of claim 14, wherein:
the memory device has a non-uniform access timing characteristic such that a time taken to access a memory address is dependent on preceding access activity within the memory device; and
the representation includes a representation of the non-uniform access timing characteristic.

16. A method comprising:
receiving memory access commands directed to a memory device, each memory access command specifying a memory address to be accessed;
based on a stored representation of a plurality of states available to the memory device, determining an order for the received memory access commands; and
issuing the received memory access commands, in the determined order, to be performed by the memory device;
wherein the representation comprises a representation of a plurality of potential transitions between pairs of the plurality of states, wherein the plurality of potential transitions includes a potential transition between at least on state and each of at least two other states; and
wherein the representation is implemented as a directed graph, such that each state of the plurality of states corresponds to a node of the directed graph and each potential transition of the plurality of potential transitions corresponds to an edge of the directed graph;
wherein the determining of the order for the received memory access commands is performed by:
based on the representation, testing a plurality of potential orders for the received memory access commands to determine at least one optimisation parameter for each potential order;
determining the order as one of the potential orders which optimises one or more of the at least one optimisation parameters; and
the testing of the plurality of potential orders is performed by iterating through states of the representation such that, for each iterated state, a next state to optimise one or more of the at least one optimisation parameters is determined.

* * * * *